(12) United States Patent
Lin

(10) Patent No.: US 7,242,554 B1
(45) Date of Patent: Jul. 10, 2007

(54) HARD DISK DRIVE FIXING STRUCTURE

(75) Inventor: Wang-Hsiang Lin, Taipei County (TW)

(73) Assignee: Chern Shi Tech Co., Ltd., Zhongli (TW)

( * ) Notice: Subject to any disclaimer, the term of this patent is extended or adjusted under 35 U.S.C. 154(b) by 0 days.

(21) Appl. No.: 11/491,897

(22) Filed: Jul. 25, 2006

(51) Int. Cl.
*H05K 5/00* (2006.01)
*H05K 7/00* (2006.01)

(52) U.S. Cl. ................................ 360/137; 361/685

(58) Field of Classification Search ............ 360/137, 360/98.08; 361/685; 439/296
See application file for complete search history.

(56) References Cited

U.S. PATENT DOCUMENTS

| | | | | |
|---|---|---|---|---|
| 5,911,589 A * | 6/1999 | Chen | ................... | 439/296 |
| 6,249,431 B1 * | 6/2001 | Chan | ................... | 361/685 |
| 6,317,317 B1 * | 11/2001 | Lu et al. | ................... | 361/685 |
| 6,639,792 B1 * | 10/2003 | Chang | ................... | 361/685 |
| 6,891,721 B2 * | 5/2005 | Huang | ................... | 361/685 |

* cited by examiner

*Primary Examiner*—Tianjie Chen
(74) *Attorney, Agent, or Firm*—Birch, Stewart, Kolasch & Birch, LLP

(57) ABSTRACT

A hard disk drive fixing structure can accommodate a hard disk drive and can electrically connect with a computer to transmit information therebetween. The hard disk drive fixing structure has an accommodation casing; two rotary fixing members, which are corresponding to the fixing threaded holes of the hard disk drive, are pivotally installed to two lateral sides of the accommodation casing respectively; each rotary fixing member has at least one fixing protuberance; via the rotation of the rotary fixing members, the fixing protuberances can be respectively inserted into or withdrawn from the fixing threaded holes. Thereby, the hard disk drive can be fast assembled to/disassembled from the hard disk drive fixing structure of the present invention without any screwing/unscrewing activity but just via rotating the rotary fixing members.

8 Claims, 5 Drawing Sheets

HARD DISK DRIVE FIXING STRUCTURE

FIELD OF THE INVENTION

The present invention relates to a fixing structure, particularly to a hard disk drive fixing structure, which can accommodate a hard disk drive and can electrically connect with a computer to transmit information therebetween.

BACKGROUND OF THE INVENTION

With the ever-advancing information technology, the new-generation digital storage media, such as the compact flash memory, the Smart Media and the Memory Stick, have gradually replaced the low-capacity floppy disks, such as 1.44M floppy devices. With the popularization of computers, digital cameras, digital pen recorders and the like, the demand for digital storage devices also grows day by day. Currently, in addition to the dedicated hard disk drives for computers, the manufacturers also produce various storage devices to meet the market, such as external hard disk drives, server database hard disk drives, hard drive arrays and detachable hard disk drives.

The abovementioned hard disk drives all need fixing inside accommodation devices, which can electrically connect with computers and enable the information transmission between the hard disk drives and the computers. The method that a hard disk drive is arranged inside an accommodation device and the method that the accommodation device connects with a computer determine the types and the names of the abovementioned hard disk drives. No matter what type the hard disk drive is, it needs fixing to the accommodation device securely. Thus, a fixing structure for fast and easily assembling/disassembling a hard disk drive is necessary.

In the conventional hard disk drive fixing structure, a hard disk drive is fixed to an accommodation device with screws. However, the user usually has to change the hard disk drive if he often uses a large amount of data. When fixing the hard disk drive to the fixing structure, the user often finds that his screws is insufficient to completely fix the hard dick drive, or he fixes the hard disk drive to the fixing structure with only two screws to avoid the trouble of too many screwing/unscrewing actions in the future assemble/disassemble. Those two abovementioned actions usually cause the swing of the operating hard disk drive, which is likely to disconnect the connection interface. Thus, the hard disk drive is likely to be damaged, or the computer is likely to crash. Besides, frequent screwing/unscrewing actions will finally damage the screw thread, and the hard disk drive is then unable to be fixed to the fixing structure securely.

SUMMARY OF THE INVENTION

The primary objective of the present invention is to provide a hard disk drive fixing structure, whereby a hard disk drive can be fast secured to the fixing structure without any screwing activity.

To achieve the abovementioned objective, the present invention proposes a hard disk drive fixing structure, which is used to accommodate and fix a hard disk drive having fixing threaded holes on the lateral sides thereof. The hard disk drive fixing structure of the present invention is characterized in: the fixing structure has an accommodation casing; two rotary fixing members, which are corresponding to the fixing threaded holes of the hard disk drive, are pivotally installed to two lateral sides of the accommodation casing respectively; each rotary fixing member has at least one fixing protuberance; via the rotation of the rotary fixing members, the fixing protuberances can be respectively inserted into the fixing threaded holes, and the hard disk drive is thus fixed.

DETAILED DESCRIPTION OF THE PREFERRED EMBODIMENTS

Figure 1:
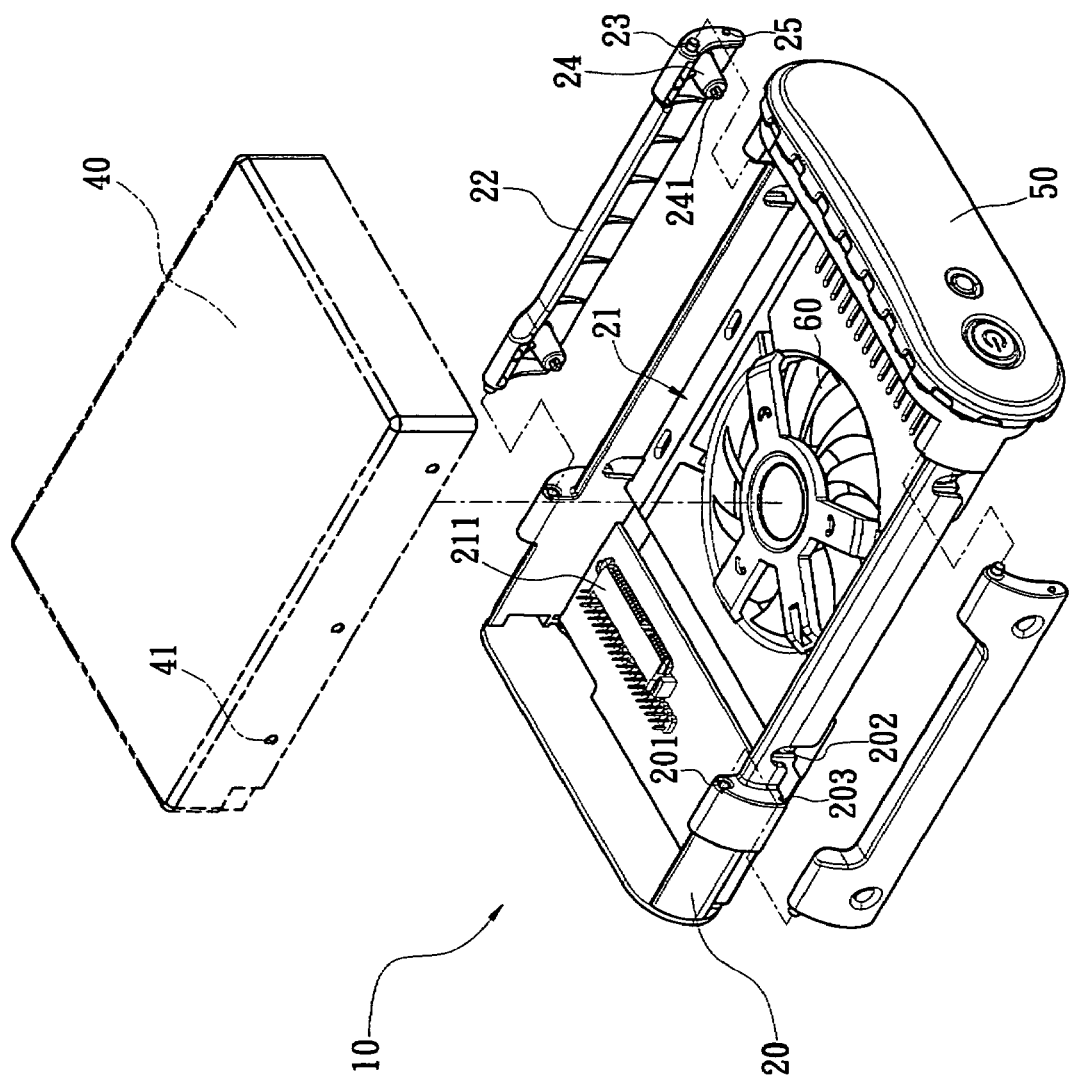
FIG. 1 is a perspective exploded view schematically showing the hard disk drive fixing structure according to the present invention.
Figure 2:
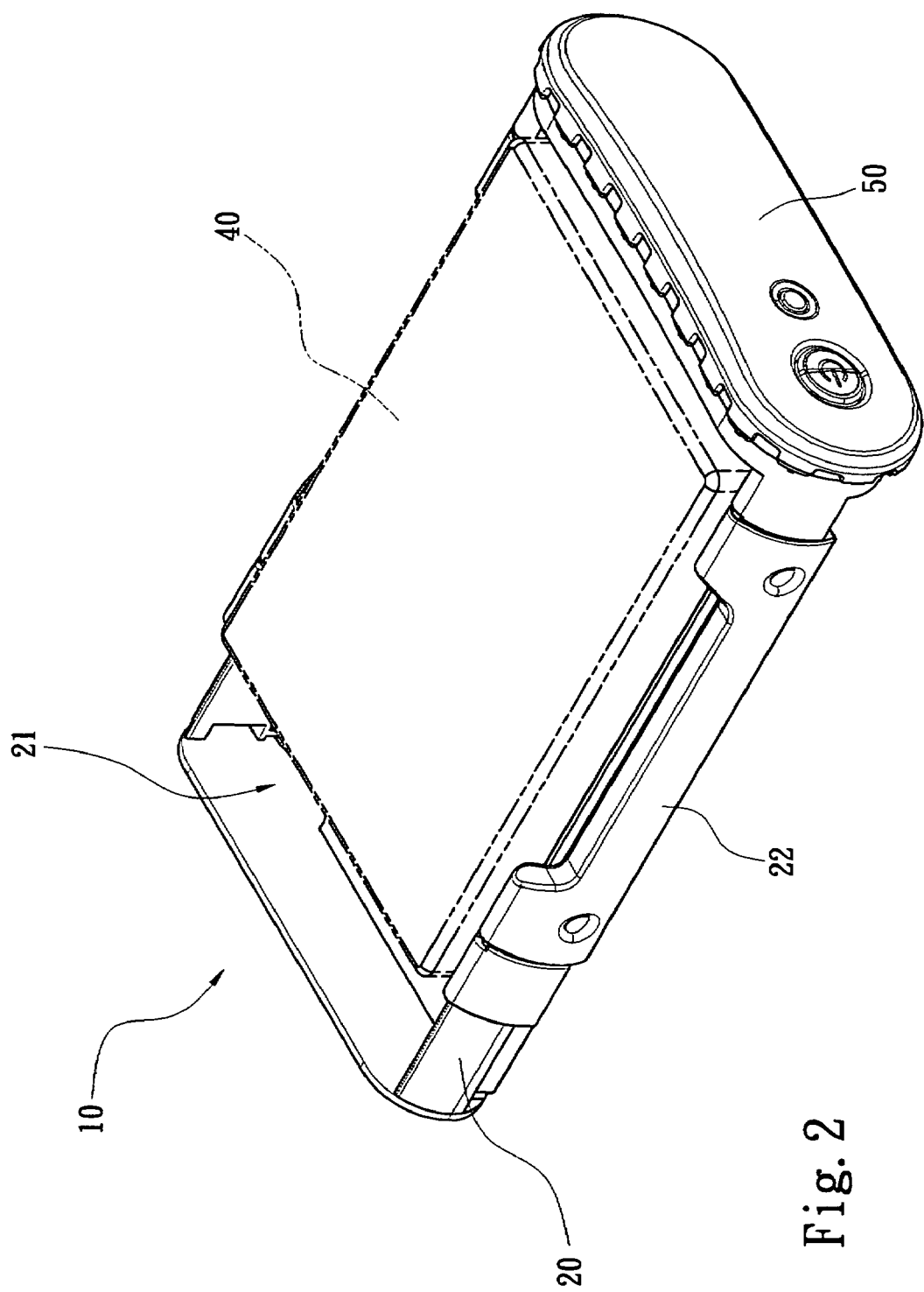
FIG. 2 is a perspective view schematically showing that the hard disk drive has been assembled into the fixing structure according to the present invention.

Refer to FIG. 1 a perspective exploded view schematically showing the hard disk drive fixing structure according to the present invention and FIG. 2 a perspective view schematically showing that the hard disk drive has been assembled into the fixing structure according to the present invention. The hard disk drive fixing structure of the present invention is used to accommodate and secure a hard disk drive 40 having fixing threaded holes 41. The hard disk drive fixing structure 10 of the present invention has an accommodation casing 20, and the accommodation casing 20 has a panel 50 and an accommodation chamber 21. The accommodation chamber 21 has a connector 211 to electrically connect with the hard disk drive 40 and has an electric fan at the bottom thereof. The accommodation casing 20 has pivotal holes 201 at the lateral sides thereof. Two rotary fixing members 22, which are corresponding to the fixing threaded holes 41, are respectively pivotally installed to the pivotal holes 201, and each end of the rotary fixing member 22 has a pivotal tip 23 pivotally coupled to the pivotal hole 201. Each rotary fixing member 22 has at least one fixing protuberance 24, and each fixing protuberance 24 has a fixing end 241 for being fitted to the fixing threaded hole 41. The accommodation casing 20 has through-holes 202, and the fixing protuberances 24 of the rotary fixing member 22 can thus respectively penetrate the through-holes 202 and be inserted into the fixing threaded holes 41 of the hard disk drive 40. The accommodation casing 20 also has positioning slots 203, and the rotary fixing members 22 correspondingly have positioning protrusions 25. The positioning protrusions 25 can be slidably snap-fitted to the positioning slots 203; thereby, the rotary fixing members 22 are fixed to the accommodation casing 20, and the fixing ends 241 of the fixing protuberances 24 are also respectively inserted into the fixing threaded holes 41 of the hard disk drive 40; and thus, the hard disk drive 40 is secured to the hard disk drive fixing structure 10 of the present invention.

Figure 3A:
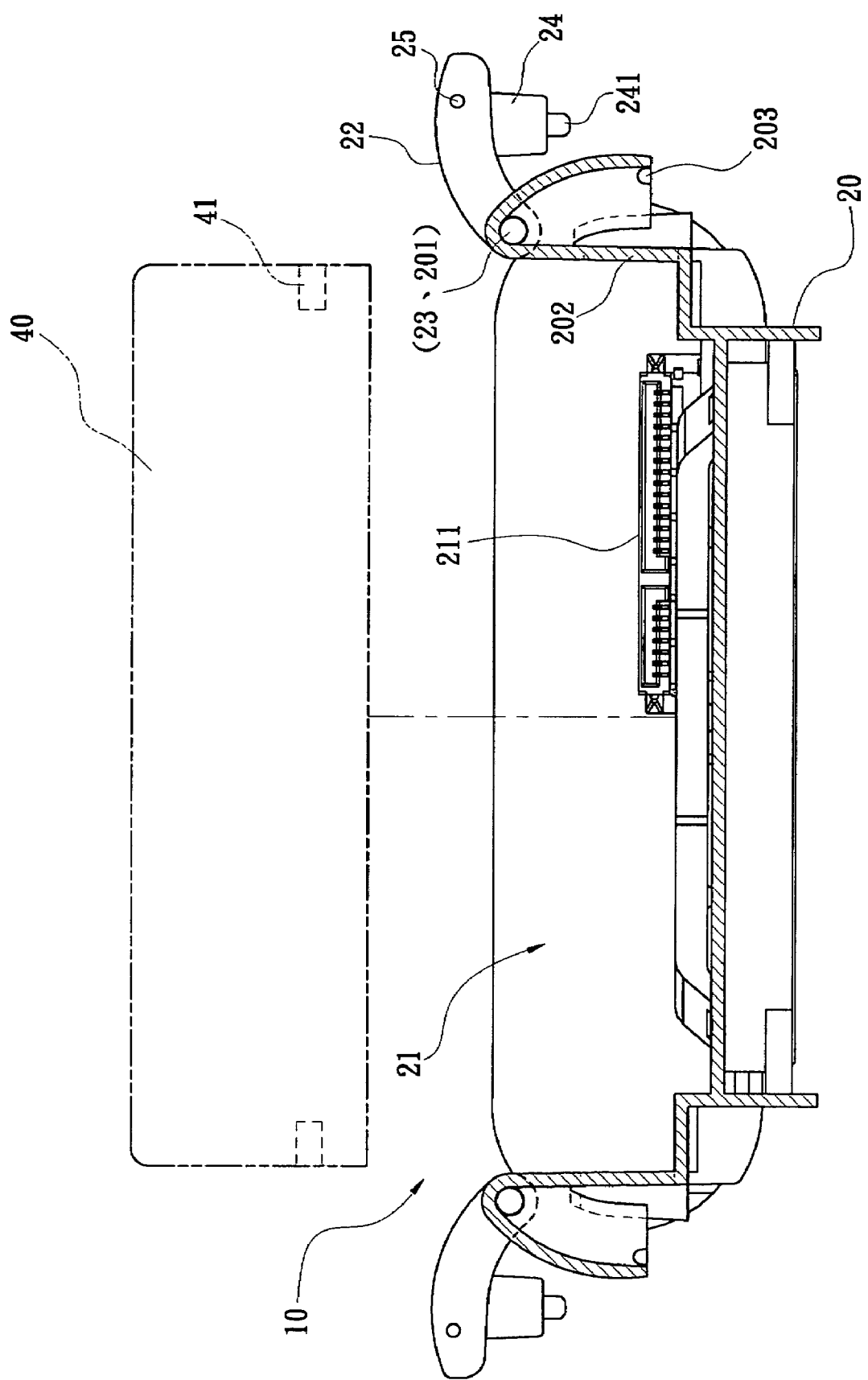
FIGS. 3A~3C are sectional views schematically showing the process of assembling the hard disk drive to the hard disk drive fixing structure according to the present invention.
Figure 3B:
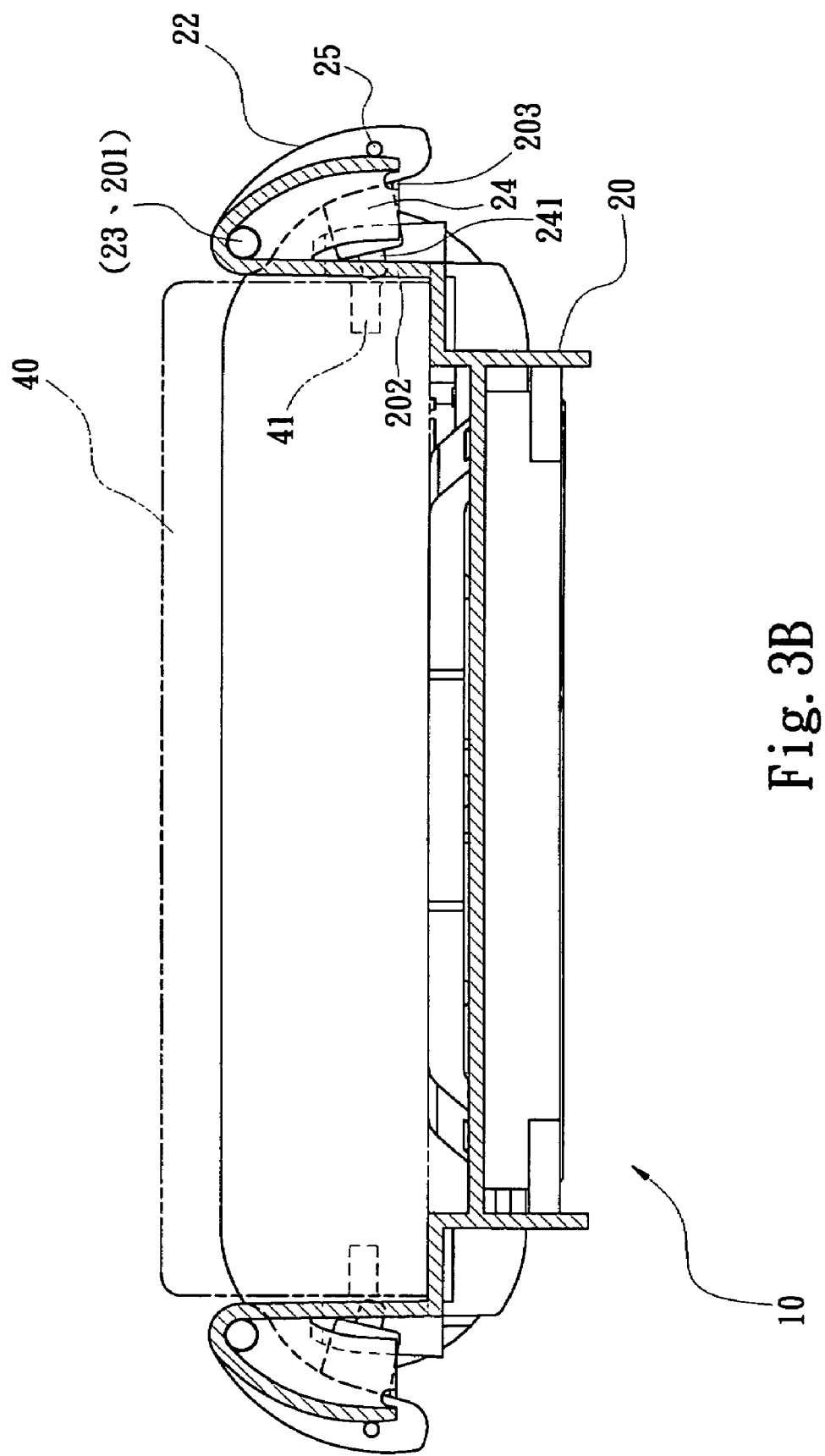
Figure 3C:
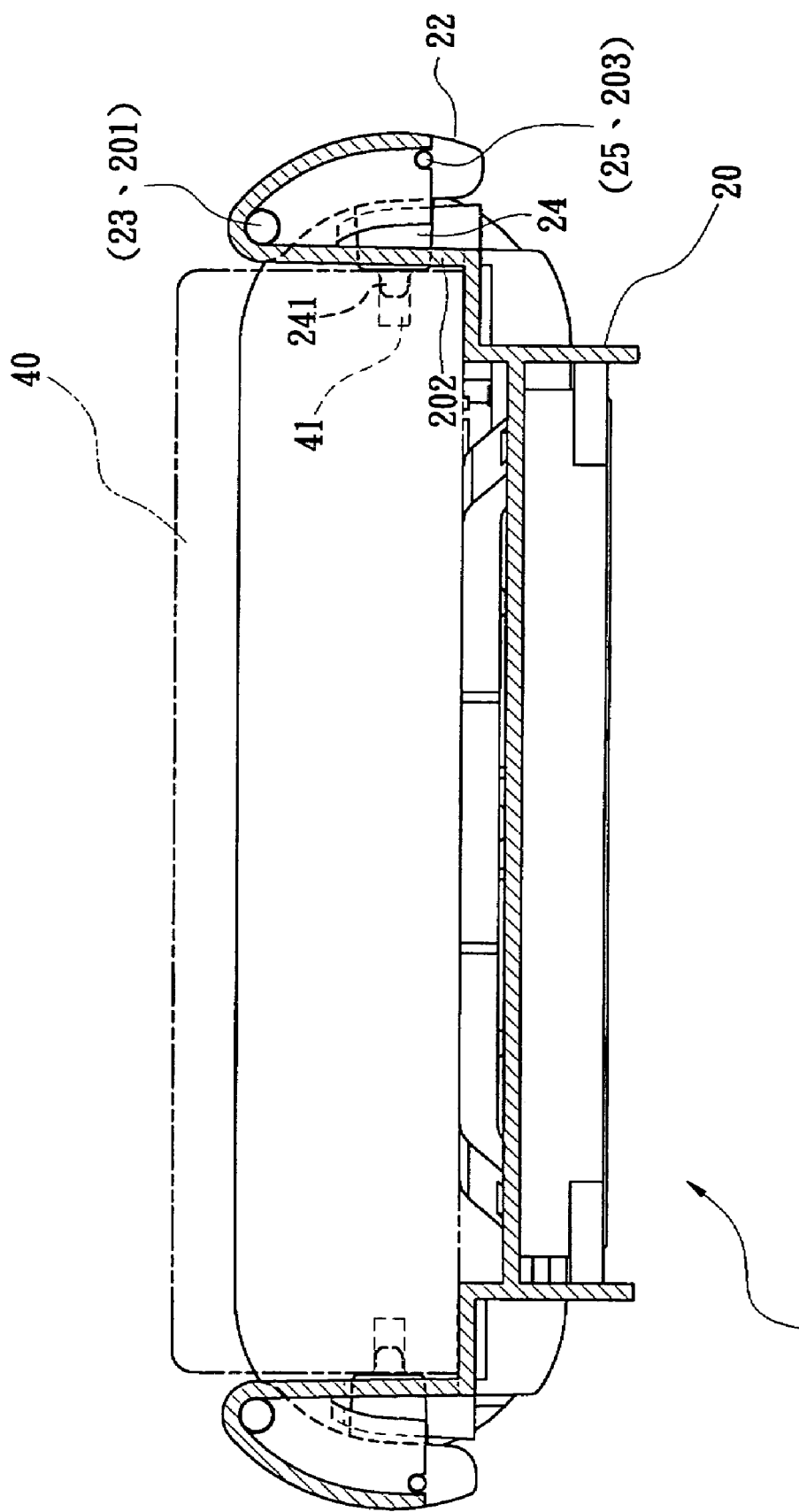

Refer to FIG. 1 again, and refer to FIGS. 3A~3C sectional views schematically showing the process of assembling the hard disk drive to the hard disk drive fixing structure according to the present invention. When the user intends to assemble the hard disk drive 40 into the hard disk drive fixing structure 10, he firstly lifts the rotary fixing members 22 and then places the hard disk drive 40 into the accommodation chamber 21 of the accommodation casing 20 and fits the hard disk drive 40 to the connector 211 to electrically connect the hard disk drive 40 with the hard disk drive fixing structure 10, as shown in FIG. 3A. Next, the rotary fixing members 22 are rotated downward, as shown in FIG. 3B. When the positioning protrusions 25 of the rotary fixing members 22 are slidably snap-fitted to the positioning slots 203 of the accommodation casing 20, the fixing ends 241 of the fixing protuberances 24 of the rotary fixing members 22 are also respectively inserted into the fixing threaded holes 41 of the hard disk drive 40 at the same time, and the hard disk drive 40 is thus secured to the hard disk drive fixing structure 10 of the present invention, as shown in FIG. 3C. When the user intends to disassemble the hard disk drive 40 from the hard disk drive fixing structure 10, the abovementioned steps will be performed in the reverse sequence. Herein, the disassembling steps will not be described repeatedly. In summary, the hard disk drive 40 can be fast assembled to/disassembled from the hard disk drive fixing structure 10 of the present invention without any screwing/unscrewing activity but just via rotating the rotary fixing members 22.

Those described above are the preferred embodiments to clarify the present invention. However, it is not intended to limit the scope of the present invention. Any modification and variation according to the spirit of the present invention is to be also included within the scope of the present invention.

What is claimed is:

1. A hard disk drive fixing structure, used to accommodate and secure a hard disk drive having fixing threaded holes respectively disposed at the opposite lateral sides thereof, wherein:

said hard disk drive fixing structure has an accommodation casing; two rotary fixing members, which are corresponding to said fixing threaded holes of said hard disk drive, are pivotally installed to two lateral sides of said accommodation casing respectively; each said rotary fixing member has at least one fixing protuberance; via the rotation of said rotary fixing members, said fixing protuberances can be respectively inserted into said fixing threaded holes, and said hard disk drive is thus fixed.

2. The hard disk drive fixing structure according to claim 1, wherein said accommodation casing has an accommodation chamber, and said accommodation chamber has a connector to electrically connect with said hard disk drive.

3. The hard disk drive fixing structure according to claim 2, wherein said accommodation chamber has an electric fan at the bottom thereof.

4. The hard disk drive fixing structure according to claim 1, wherein said accommodation casing has pivotal holes, and each end of said rotary fixing member has a pivotal tip pivotally coupled to said pivotal hole.

5. The hard disk drive fixing structure according to claim 4, wherein said accommodation casing has through-holes, and said fixing protuberances of said rotary fixing member can thus respectively penetrate said through-holes and be inserted into said fixing threaded holes of said hard disk drive.

6. The hard disk drive fixing structure according to claim 5, wherein said accommodation casing has positioning slots, and said rotary fixing members correspondingly have positioning protrusions; said positioning protrusions can be slidably snap-fitted to said positioning slots; thereby, said rotary fixing members are fixed to said accommodation casing, and said fixing protuberances are also respectively inserted into said fixing threaded holes.

7. The hard disk drive fixing structure according to claim 6, wherein each said fixing protuberance has a fixing end for being fitted to said fixing threaded hole.

8. The hard disk drive fixing structure according to claim 1, wherein said accommodation casing has a panel.

* * * * *